United States Patent
Escobosa et al.

(10) Patent No.: US 9,239,095 B1
(45) Date of Patent: Jan. 19, 2016

(54) SERVO-AUTOMATED TRANSMISSION

(71) Applicants: Alfonso Soto Escobosa, Placentia, CA (US); Marcus Paul Escobosa, Lake Forest, CA (US)

(72) Inventors: Alfonso Soto Escobosa, Placentia, CA (US); Marcus Paul Escobosa, Lake Forest, CA (US)

( * ) Notice: Subject to any disclaimer, the term of this patent is extended or adjusted under 35 U.S.C. 154(b) by 0 days.

(21) Appl. No.: 13/999,097

(22) Filed: Jan. 13, 2014

(51) Int. Cl.
*F16H 3/08* (2006.01)
*F16H 3/02* (2006.01)

(52) U.S. Cl.
CPC .......................... *F16H 3/02* (2013.01)

(58) Field of Classification Search
USPC .................................. 192/70, 85.23
See application file for complete search history.

(56) References Cited

U.S. PATENT DOCUMENTS

| | | | |
|---|---|---|---|
| 1,735,187 A * | 11/1929 | Storle | 74/375 |
| 2,592,695 A * | 4/1952 | Hindmarch | 192/53.5 |
| 2,792,919 A * | 5/1957 | Klaue | 192/70 |
| 2,869,702 A * | 1/1959 | Hindmarch | 192/85.22 |
| 2,891,645 A * | 6/1959 | Hindmarch | 192/48.614 |
| 3,823,798 A * | 7/1974 | Ostrowski | 188/71.4 |
| 7,950,510 B2 * | 5/2011 | Marsh et al. | 192/54.51 |
| 2013/0233104 A1 * | 9/2013 | Diani et al. | 74/373 |

OTHER PUBLICATIONS

Double Clutch Transmission (DCT) Using Multiplexed Linear Actuation Technology and Dry Clutches for High Efficiency and Low Cost, 2007.
High Efficiency 6-speed Automatic Transmission, Apr. 12, 2010.
A Five-Speed Starting Clutch Automatic Transmission Vehicle, 2003.
New Launch Devices for Automatic Transmissions, Apr. 8, 2013.

* cited by examiner

*Primary Examiner* — Edwin A Young
(74) *Attorney, Agent, or Firm* — Stetina Brunda Garred & Brucker

(57) ABSTRACT

A unique transmission based on a servo-automated gearbox is disclosed wherein each of its gear pairs is self-disengaging and self-engaging requiring only the switching of dedicated hydraulic valves to transition from the disengagement of a gear pair to the engagement of a newly selected pair. During shifting, one servo controls the zeroing of the difference between the speed of the engine and the speed of the gearbox output shaft as required by the gear ratio of the selected gear pair. Concurrently another servo, by controlling the slip of several gear pairs, maintains the current vehicle acceleration or deceleration while also decelerating or accelerating, respectively, the slip-engaged engine toward the required speed.

8 Claims, 4 Drawing Sheets

SERVO-AUTOMATED TRANSMISSION

CROSS REFERENCES

No automated transmission is known to exist wherein each of the gear pairs is self-clutching and self-engageable, requiring only the electromagnetic switching of a servo-varied pressure source to transition from the disengagement of a given pair to the engagement of another pair.

FIELD OF THE INVENTION

This invention pertains to automotive automatic transmissions and more specifically to servo-automated gearbox transmissions.

BACKGROUND OF THE INVENTION

Of the various attempts to develop a transmission that improves the efficiency of the fluid-coupled automatic transmission, the dual clutch, automated gearbox currently in production accomplishes this goal. The transmission, however, is equally complex and more than doubles the size, weight and cost of the current manually operated gearbox. Actually, since the proposed servo-automated transmission eliminates all clutches, synchronizers, engagement dogs and their associated mechanical actuation, its size and weight is less than that of a manual gearbox. It will be shown that by involving servo control of the system, self-clutching and self-disengagement/engagement with near instant shifts are not only possible, they are seamless without loss or gain of transmitted torque:

SUMMARY OF THE INVENTION CONCEPT

The key of the invention concept is manifested in FIG. 2B. The engageable gears of each mated pair are split into two halves. The inner surfaces of the halves assume the role of piston areas of two opposed hydraulic actuators. The shafts containing the engageable gears are hollow and enclose hydraulic control lines. Each line originates from an electrohydraulic bipolar valve and terminates at the center of the split engageable gear. The engageable gear halves are bordered with rigidly attached retainers. The engageable gears mate with likewise split gears that are angularly staggered and rigidly attached to opposing shafts. Engagement of the mated pair is initiated when high pressure is switched between the engageable gear halves, causing the two halves to be bucked by the bordering retainers. The high hydrostatic force clamps the gear halves to the retainers. No wear is expected on the contact surface since clamping is servoed to take place at zero relative velocity.

Three servo loops of the gearbox provide automatic launch and near-instant upshifts/downshifts with uninterrupted acceleration. Upon disengagement of a gear pair, one servo loop, based on rate feedback, zeros the difference between the angular velocity of the disengaged engine and the angular velocity of the gearbox output shaft multiplied by the gear ratio of the selected gear pair, and initiates engagement. Another servo loop, based on acceleration feedback, maintains the current vehicle acceleration while also decelerating or accelerating the disengaged engine toward the required angular velocity, by controlling slip of several gear pairs. The third servo loop coordinates the angular velocity of the engine with the acceleration of the vehicle during vehicle launch.

A conventional parallel-arranged mild electric hybrid system, with separate or integrated gear-engageable motor and alternator, is proposed where the motor helps accelerate (and the alternator helps to decelerate) the slip-engaged engine to the required engagement speed, the motor also providing torque during and after launching. As such, the system allows the fluid coupling and the reversing gears to be eliminated.

DETAIL DESCRIPTION OF THE SERVO-AUTOMATED GEARBOX CONCEPT

Figure 1A:
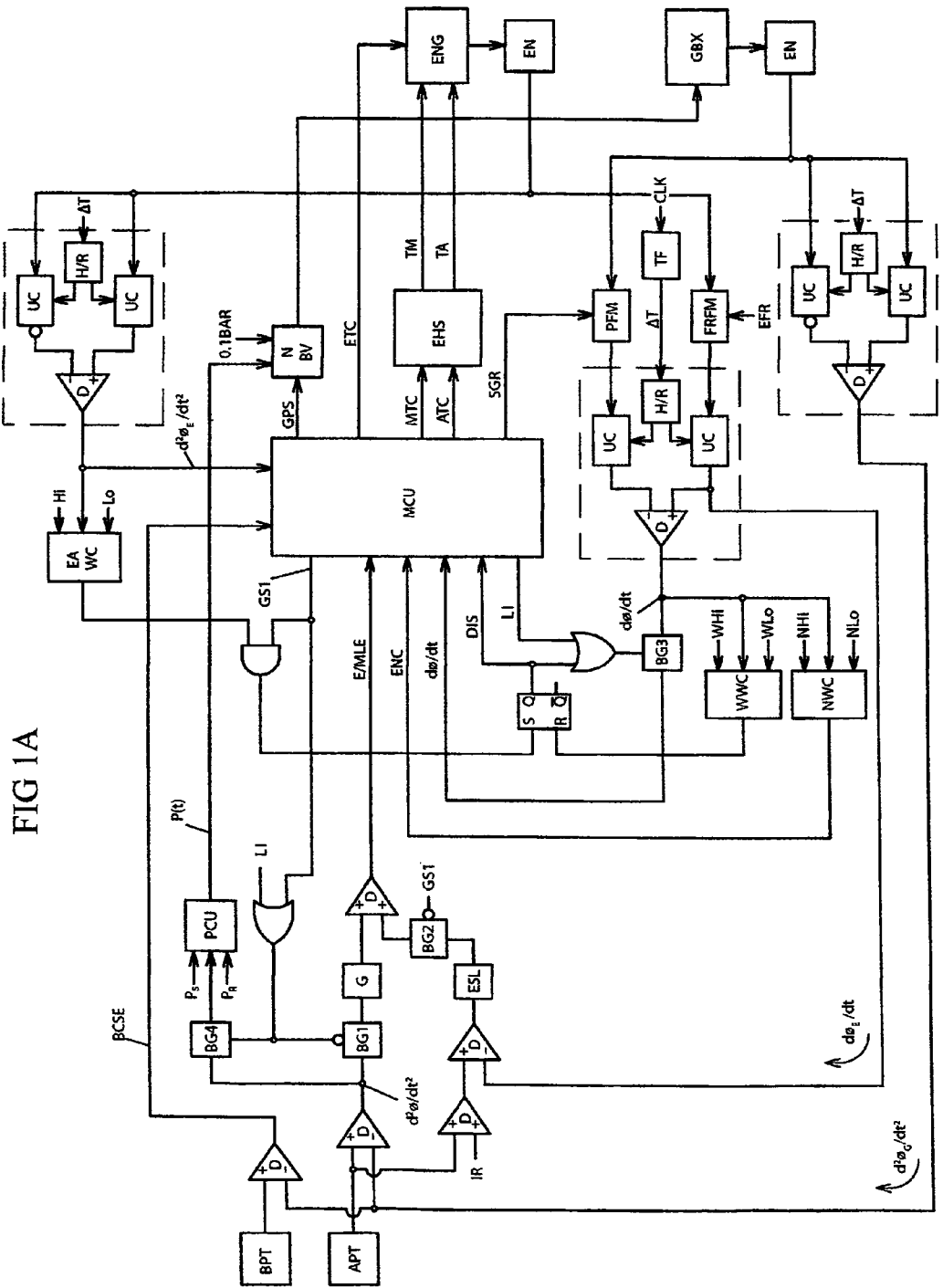
FIG. 1A is the block diagram of the gearbox servo control units.
Figure 1B:
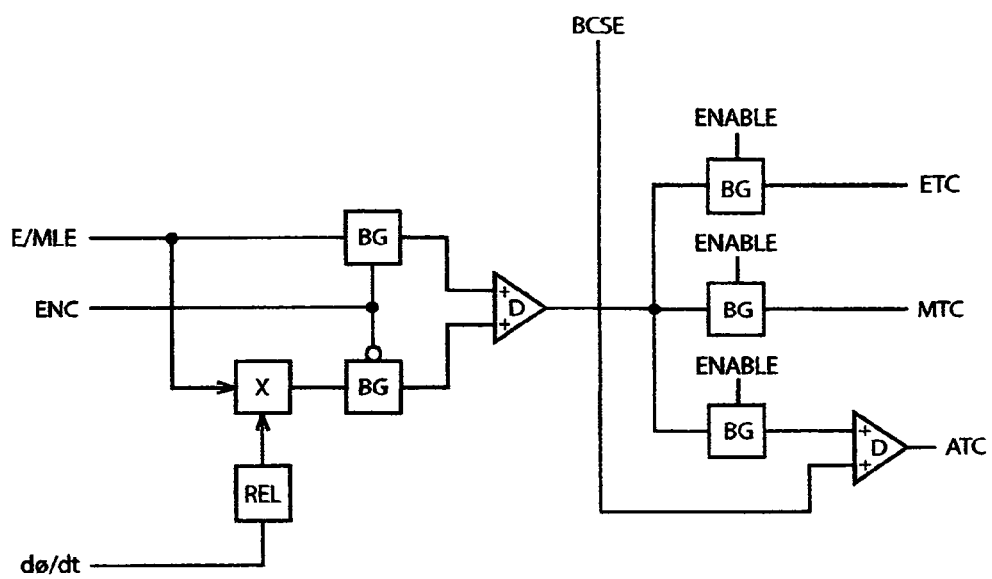
FIG. 1B shows circuits related to launch and gear shift mode control.

The following list of legends correspond to FIGS. 1A and 1B: (ASP) acceleration signal processor (ATC) alternator torque command (APT) accelerator pedal transducer (BG) binary gate—the output is zeroed by a zero input state (BPT) brake pedal transducer (BCSE) brake control servo error (BV) bipolar valves (D) digital adder/subtracter (DIS) disengage command (EAWC) engine angular acceleration window comparator (DUC) alternately toggled, differentially added, dual up counters (EHS) electric hybrid system (ENC) engage, command (EN) rotary bit stream encoder (ENG) powertrain engine (ESL) engine speed limiter (EFR) engine fixed ratio binary (E/MLE) engine/motor load error (ETC) engine torque command (FRFM) fixed ratio frequency multiplier (G) proportional plus integral servo compensation (GBX) gearbox (GPS) gear pair selection for disengagement or for slip engagement leading to final engagement (GSI) gear shift initialization (H/R) hold count/reset to zero (IR) engine idle rpm reference (LI) launch initialization (MCU) mode control unit (MTC) motor torque command (PCU) pressure control unit (P(t)) slip engagement/final engagement pressure (PFM) programmable frequency multiplier (REL) delta rate error limiter (SGR) selected gear ratio (TF) toggle flip/flop (TFG) toggle frequency generator (TA) alternator torque (TF) toggle frequency (TM) motor torque (UC) up counter (WWC) wide window comparator (NWC) narrow window comparator limits ($\Delta T$) delta time of an up count (X) multiplier The automated gearbox shift control concept consists of two servos with feedback signals originating from single track, bit stream, rotary encoders (EN). Briefly, one servo (an engine rate control servo) helps to torque the engine to where its angular velocity ($d\phi_E/dt$) matches the angular velocity of the gearbox output shaft ($d\phi_G/dt$) that is first multiplied by the ratio of, the selected gear pair. The difference of the two velocities, the servo rate error ($d\phi/dt$), where $\phi=e_E-e_G$, is passed to the mode control unit (MCU) which channels it to the error-reducing accelerating torque of the hybrid motor or to the decelerating torque of the hybrid alternator. The second servo (a gearbox slip torque control servo) taps the acceleration error branch of the engine's load control servo and routes that error to the input of the pressure control unit (PCU). The variable output pressure (P(t)) that it provides controls the slip engagement of the selected gear pair and the set of high-end gear pairs while executing a low gear upshift or a set of low-end gear pairs, while executing a high gear downshift, either slip control occurring while delta rate error zeroing takes place. Two torques are produced by the engagement; 1) the slip torque on the gearbox output shaft that is servoed to correspond to the driver accelerator or brake command and 2) the decelerating or accelerating reaction torque on the engine by the gearbox, the latter aided by the torque on the engine by the hybrid alternator or motor.

The programmable frequency multiplier (PFM), which is clocked by the gearbox output encoder, performs the required ratio multiplication. The delta angular rate error and the angular acceleration processors convert the clock frequencies into corresponding binaries. Both processors are composed of differentially added dual up counters (UC) wherein counting takes place in $\Delta t$ and held for another $\Delta t$ before resetting in order to provide a continuous input to the adder/subtracter in spite of alternately performed counting. The delta time must encompass a sufficient number of encoder track bits in order to allow accurate calculation of angular velocity and acceleration. Assuming 4096 bits-per-revolution encoders, $\Delta t$ may on the average span 128 bits. Note in the case of calculated acceleration, the consecutively held rates ($d\phi/\Delta dt$) of the equally clocked counters, when differentially added, become $\Delta(\Delta\phi/\Delta t)/\Delta t$ which approximates $d^2\phi/dt^2$.

Specifically, a shift involves the following events: For starters, the mode control unit (MCU) issues a gear shift initialization (GSI) signal that is applied to the binary gates (BG1) and (BG2) of the engine load control servos. The gate zeros the input of the compensation unit (G), causing the output of its integrator branch to hold. The constant hold prevents interference of the delta error zeroing operation by the driver. The initialization signal also gates the vehicle acceleration error to the pressure control valve. It also gates the within-limits output of the engine acceleration window comparator (EAWC), which indicates the instant the transmitted torque is at its lowest point. Concurrently, the programmable frequency multiplier (PFM) is re-programmed to correspond to the selected gear ratio. The multiplied frequency is applied to the clock input of the up counter in the rate error processor. The step change in that counter frequency steps up the delta angular rate error ($d\phi/dt$) which is passed to the mode control unit through binary gate (BG3) where it is routed to the hybrid motor or the hybrid alternator to help accelerate or decelerate, respectively, the slip disengaged engine.

The gear shift concept is best explained using, as an example, a six speed gearbox upshifted from 2nd to 3rd gear while the vehicle is accelerated. The programmable frequency divider is re-programmed to generate the frequency that corresponds to the 3rd gear ratio. The engine is decelerated by the slip torque of the 3rd, 4th, 5th and 6th high-end gear pairs, aided by the alternator. The servoed intermediate pressure applied to the bipolar valves, of the above gear pairs automatically maintains the driver-commanded vehicle acceleration. The bipolar valves of the 3rd, 4th, 5th and 6th gear pairs remain switched to the servoed intermediate pressure until just before the within-limits of the narrow referenced window comparator (NWC) is reached. This task is accomplished by the wide-referenced window comparator (WWC) that is referenced with slightly wider (+) and (−) limits. When the within-limits of this comparator is reached, the bipolar valves of the 4th, 5th and 6th gear pairs are switched to low supply pressure leaving the rate control servo loop to finalize the 3rd gear engagement exponentially. Also, once the within-limits of the narrow referenced comparator is reached, the MCU cancels the gear shift initialization signal and restores full supply pressure ($P_S$) to the 3rd gear valve. Sole control of the vehicle acceleration through the engine load error follows the cancellation of the GSI pulse.

The advantage of a seamless torque shift in near-instant time applies to down shifts as well. The difference is the acceleration of the slip-engaged engine by the hybrid motor in conjunction with the torque induced by the viscous friction from the slip engagement of a selected set of low end gear pairs.

Automated Gearbox Conceptual Design

Figure 2A:
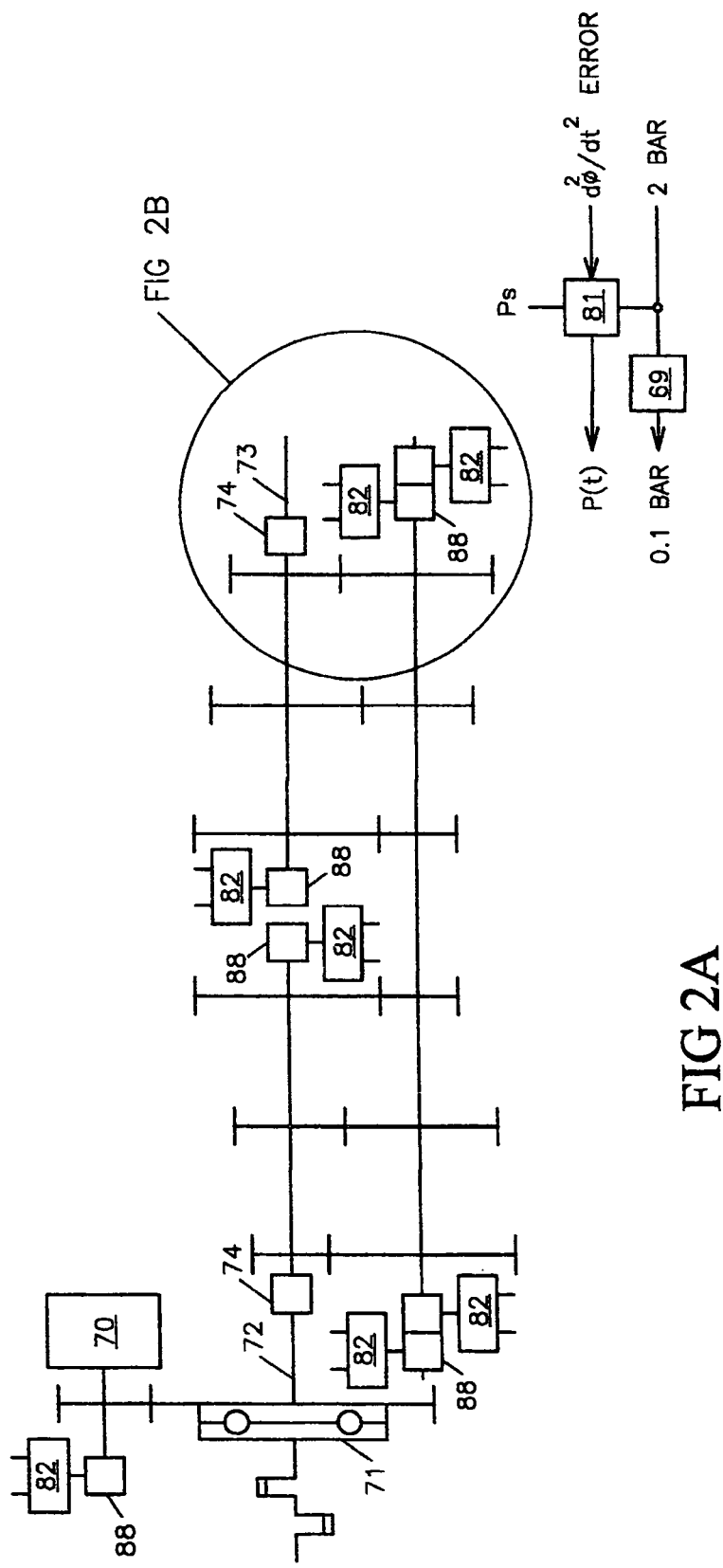
FIG. 2A is a stick description of a nine-speed gearbox.
Figure 2B:
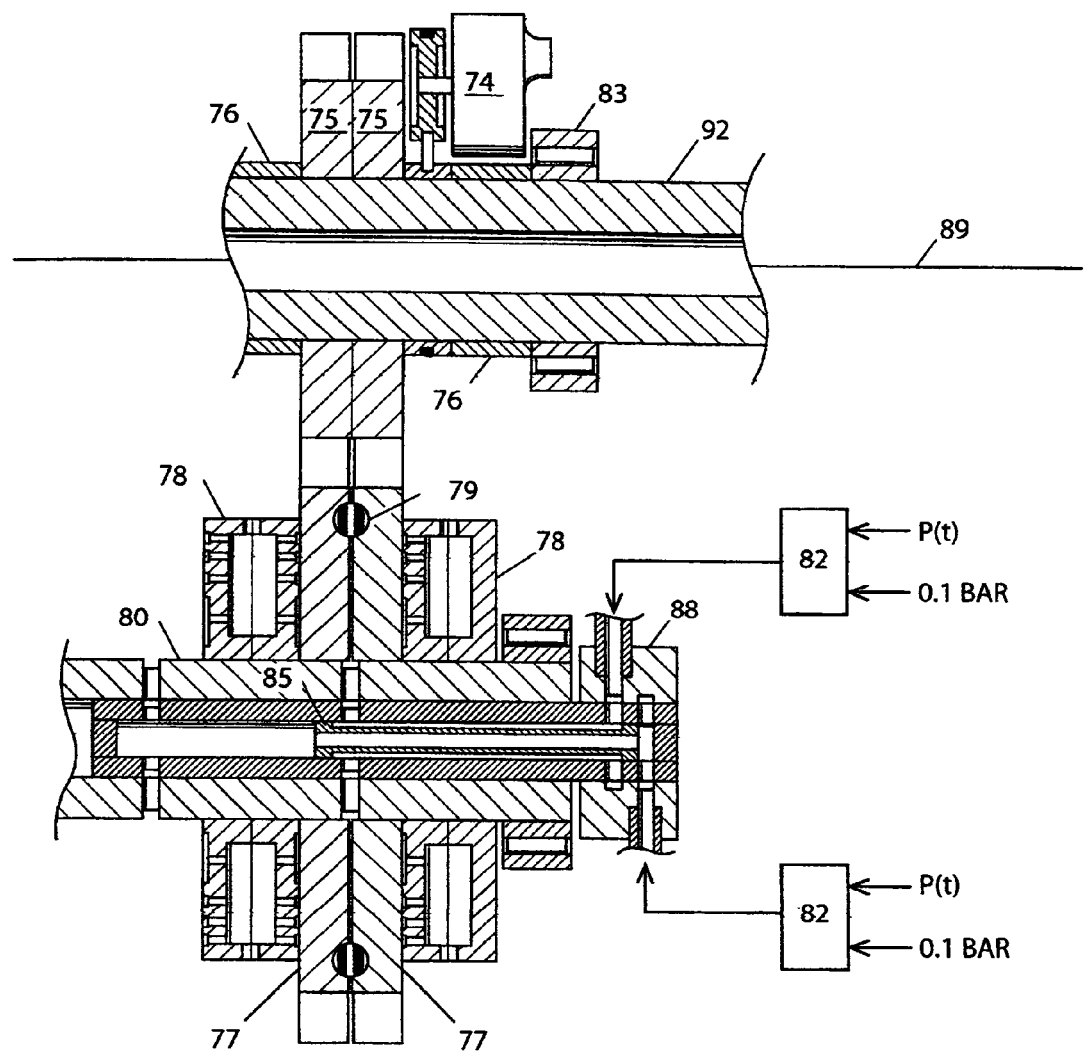
FIG. 2B is the detail side view of a portion of FIG. 2A. Also shown is the dual control lines and the dual stationary/rotating coupling to which the output ports of two bipolar valves connect.

FIGS. 2A and 2B show one possible gearbox architecture. The following are the legends of the pertinent parts: (69) pressure regulator (70) hybrid motor/alternator (71) wet, torsional damper (72) engine driven shaft (73) gearbox output shaft (74) belt driven, single bid stream, rotary encoder (75) staggered and rigidly attached gear (76) unattached spacer (77) engageable gear (78) rigidly attached composite steel retainer (79) elastomeric static seal (80) gearbox layshaft (81) pressure control unit providing up to 200 bars pressure (82) bipolar 3-way valve (85) shaft-attached, dual-concentric, hydraulic control lines (88) stationary-to-rotation coupling (89) casing partition The engine driven shaft and gearbox output shafts contain an end-mounted bit stream encoder. Both mating gears are split into two halves. The hollowed centers of the shafts contain hydraulic engagement/disengagement control lines. Each line originates from a 3-way bipolar valve and terminates at a site next to where the center of an engageable gear is located. A set of radial lines pass from the sites through the hollow shafts and connect to the center of the split engageable gears. The sides of the engageable gears are bordered with rigidly attached retainers while the sides of the rigidly attached gears are bordered with loose non-functional spacers that serve to space these gears during robotic assembly. During assembly, the halves of the engageable gears, the rigidly attachable gears and the retainers are stacked on their respective shafts while separated by removable spacers, possibly not wider than 0.2 mm thick. The stagger of the rigidly attachable gear halves is set mechanically during assembly while the corresponding stagger of the engageable gear halves automatically follows that of the rigidly attached mated gear when they are mated. The expected assembling of the rigidly attached parts is by light press fitting followed by high temperature brazing, assuming here the shafts are first electroplated.

As previously stated, engagement of the selected gear begins with high pressure fluid switched into the split, causing a high lateral force that is bucked by the side retainers. In order to quickly squeeze out the film of interface fluid and bring about a metal-to-metal contact, the squeeze pressure, which is amplified by the ratio of the split gear piston area to the gear/retainer interface land area, may be set according to the transmitted torque. Also, in order to minimize the time leading to metal-to-metal contact, the preferred design, shown in FIG. 2B, involves grinding, say, two 2 mm-wide concentric grooves near the top on each side of the retainers. A wide groove is ground below the last land, leaving three 2 mm-wide lands over the top and a 2 mm-wide land on the bottom. In order to vent the grooves, equally spaced, small diameter holes are drilled through each groove, a total of possibly 8 holes per groove. Fluid entering the hollow retainer exits through typically four holes at the periphery. These holes also serve as access for spot welding the retainers to their respective shafts. The retainer land pattern also increases the fluid-exiting perimeter and shortens the squeeze-out distance, the latter squeeze-out including the path from the bottom land to the high pressure supply.

System Mechanical Features

1) A major problem of hydraulic control systems is entrained air in the fluid which causes a drop in bulk modulus and, thus, reduced responsiveness. Fortunately, that is not the case here. The space between the halves of each engageable gear forms a centrifuge that places the lower density, air-entrained fluid at the gear/retainer interface, where the centrifuge expels is during disengagement.

2) A split and staggered flywheel ring gear (not shown in the figures) is proposed in order to also engage/disengage the hybrid alternator/motor. This addition allows a fully excited motor to help accelerate the disengaged engine during downshifting and a fully loaded alternator to help decelerate the engine during up-shifting.

3) Since the gearbox and engine are coupled and share a common sump, the top and bottom gearbox casings can be integrated with the upper and lower engine crankcase block casings.

4) A quick engagement starting at near zero relative velocity assures negligible surface wear and heating. The high efficiency and low cost of spur gears is capitalized and quiet operation as with helical gears can be expected from the gear stagger.

5) The expected supply pressures are 200 bars for engagement and 2 bars for overall powertrain lubrication. However, a drop from 2 bars to 0.1 bar by pressure regulator (69) for disengagement would reduce viscous friction at the gear/retainer interface.

6) The volume of fluid required to cause separation of the engaging gear halves is minimal considering that the lateral displacement equals the thickness of the gear/retainer interface fluid film when the split gears are disengaged.

7) Obviously, the above gearbox features apply to all conventional gearbox architectures; the FIG. 1A gearbox is one example. Here, engagement control by the bipolar valves from at least four shaft ends is possible. This is significant in that short manifolds, each with no more than two control lines, are possible.

Launch Modes

FIG. 1B show a circuit embedded in the mode control unit of FIG. 1A that pertains to mode selection of launch and post-launch driving sources. There the engine/motor load error (E/MLE) from the load control servoes is multiplied by unity by means of the unity-limited binary of the delta rate error ($d\phi/dt$). The product, which is equal to E/MLE until multiplied by the out-of-limit exponentially decaying delta rate error, is applied through its binary gate to a binary adder. The E/MLE is mutually exclusively applied through its binary gate to the other input of the same adder once the exponential tail end reaches zero (i.e. when the engage command signal is high). The adder output is routed to an engine torque command (ETC) and the motor torque command (MTC) through their respective binary gates. These gates allow selection of 1) a completely motored engine, 2) motor-added engine or 3) motor-unaided engine.

A launch out that is more in line with sport vehicles is a possible option. Upon the driver selection of this mode, the engine is completely disengaged while braking to a stop, leaving the engine idling. Once the brake pedal is lifted, the mode control unit issues the launch initialization (LI) signal that activates the slip control servoloop. Note from FIGS. 1A and 1B that the launch initialization signal enables control of engine rpm by the delta rate control error. In this mode, engine rpm and vehicle acceleration are raised proportionately to accelerator depression. Here, however, vehicle velocity (gearbox encoder rpm) must increase from zero rpm to the required shift rpm before engagement can take place.

Assuming a second gear launch is manually selected, the mode control unit (MCU) switches all gear ratio pairs to high pressure, which in this case, amounts to the intermediate pressure (P(t)) of the pressure control unit (PCU) that is controlled by the slip control servo. Here, as in the case of up or down shifting previously described, the activated delta rate error, $\Delta(d\phi/dt)$, can still reach zero exponentially. When the delta rate falls within the limits of the wide window comparator (WWC) low disengage pressure is switched to all mated pairs, except those of the $2^{nd}$ gear pairs, causing the intermediate pressure applied to the $2^{nd}$ gear pairs to stepup to meet the commanded torque. Once the rate error falls within the limits of the narrow referenced comparator (NWC), that comparator calls on the mode control unit to reinstate the full supply pressure of the pressure control unit to all the gearbox valves, thus completing engagement.

A 9-speed gearbox is ideal for a hybrid-motor-aided or unaided launches. It allows a high-starting gear ratio and the initial sharing of the slip control torque by several gear/retainer interfaces. During gear shifts it also lowers the required change in engine rpm, which lowers the slip-heating of the hydraulic fluid. The result is exceptional short shift times that allow the mode control unit to disregard inter-shift time constraints and shift as needed for maximum fuel efficiency, regardless of what acceleration is commanded or what down shift is needed for maximum battery charging rate.

Closing Remarks and Ramifications

Torque Capability—

Referring to FIG. 2A, the highest torque is transmitted through the lowest gear pair in the output shaft. Based on a 100 mm, pinch-line diameter, engageable gear and 92 mm diameter retainers at this location, the maximum engine torque is limited to 614 N-m (450 lb-ft). The calculation, however, assumes that one can rely on an ultra high gear/retainer interface pressure to achieve a 0.5 coefficient of friction through inter-grain intrusion of the bearing surfaces.

Wear Minimization—

Considering that finite relative velocity of the gear/retainer interface is possible before metal-to-metal engagement takes place, contact surfaces that are flat and mirror-like will likely be required. In order to achieve the desired coefficient of friction a surface treatment such as ionic infusion of a ductile metal may be required. Titanium comes to mind.

Variable Pressure Control Unit—

In order to provide an energy efficient unit, one capable of meeting the required response (P(t)) of rapidly executed launches and gear shifts, a new electrohydraulic servo unit is needed, one capable of meeting the peak flow rate from fluid compressibility and from the initial minute displacement of the gear halves.

3-Way Bipolar Valves—

The system bipolar valves may consist of conventional electrohydraulic spool valves Stationary/Rotating Coupling—

High pressure leakage in a stationary/rotating coupling while its associated gear pair is engaged can be limited to an acceptable level by recently refined and automated honing processes capable of high thoroughput production of typically 0.0005 mm tolerances and 0.005 mm clearances for typically 10 mm diameter and 20 mm length parts.

Enhanced Torsional Damping—

The damped torsional pulses of the damper (71) may be further attenuated with an added hybrid system servo embedded in the mode control unit. The servo uses the engine angular acceleration processor shown in FIG. 1 as the servo feedback source. It should be noted from FIG. 2A that the engine encoder (74) leading to the acceleration processor is located past the damper. Here, the residual torque dips are countered with the positive torque of the hybrid motor while the residual torque peaks are countered by the negative torque of the alternator. If added, the servo attenuation would be limited to the high load/low rpm operation where torsional vibration can be a problem.

Enhanced Torque Capacity—

One torque enhancing possibility is to double the torque capacity of the highest torque transmitting gear (the highest ratio, low-end gear in the output shaft) by separating the gear halves, splitting each half into two gear pairs and inserting a third retainer between them. The added length of the gearbox is confined to the width of the third retainer. However, since this retainer is free of bending stress, the width can be narrowed.

The invention claimed is:

1. A clutchless servo-automated gearbox comprising a plurality of mating gear pairs, each mating gear pairs having a first gear rigidly attached to a first shaft and a second gear engageable to the first shaft, each of the first and second gears split into interior and exterior halves, the interior halves of the second gears having an elastomeric o-ring seal disposed in grooves formed in the interior halves of the second gears, second shafts of the second gears being hollow and enclosing hydraulic control lines, each line in fluid communication with a variable pressure source and terminating at a center of the second gear, the interior and exterior halves of the first and second gears disposed adjacent to retainers, the interior and exterior halves of each gear pair having a space to contain the elastomeric o-ring seal, the first gears of the plurality of mating gear pairs being attached to the first shaft in a staggered configuration, at least three servos for controlling launching and gear shifting of the gearbox.

2. The gearbox of claim 1 wherein the variable pressure source of the second gear is a 3-way bipolar valve having an output port, the output port connected to an hydraulic line leading to an engageable gear via a stationary-to-rotation coupling, a first valve input port connected to the output port of a control unit of the variable pressure source and a second valve input port connected to a low pressure source.

3. The gearbox of claim 1 wherein the retainers are hollow composite steel, each retainer formed having several concentric grooves, the grooves having two or more lands on each side of the retainer, several equally spaced axially oriented holes through each of the grooves on both sides of the retainer, several radially oriented holes through a perimeter of the retainer.

4. The gearbox of claim 3 wherein each lands is about 2 mm wide.

5. The gearbox of claim 3 wherein eight equally spaced axially oriented holes are formed through each of the grooves on both sides of the retainer.

6. The gearbox of claim 1 wherein the retainers are fabricated from hollow composite steel, the retainers each having several concentric grooves, the grooves having lands on each side.

7. The gearbox of claim 6 wherein eight lands are formed on each side of the retainer which are equally spaced apart and axially oriented holes are drilled through each of the grooves on both sides of the retainer, several radially oriented holes drilled through a perimeter of the retainer.

8. The gearbox of claim 1 wherein first, second and third servos for launching and gear shifting of the gearbox receives feedback signals from first and second encoders, the first encoder attached to an engine output shaft, the second encoder attached to gearbox output shaft;

the first servo related to torqueing of the engine output shaft to where an angular velocity of the engine output shaft matches an angular velocity of the gearbox output shaft multiplied by a ratio of a selected gear pair, the multiplication being performed by a programmable frequency multiplier which is clocked by a bit stream of the first encoder, hit stream frequencies of the first encoder and of the frequency multiplier are converted to rate binaries, a difference of two rate binaries is applied to an engine accelerating torque by a hybrid motor during a down shift or to an engine decelerating torque by an hybrid alternator during an up shift;

the second servo activated by diverting an error branch of an engine's load control servo to the control unit of the variable pressure source, an output pressure providing controlled slip engagement of a set of upper gear pairs while executing a lower gear upshift or of a set of lower gear pairs while executing an higher gear downshift, the controlled slip engagement occurring with a rate error zeroing;

the third servo varies a rpm of the engine output shaft proportionately to a gearbox output torque during an initial slip-controlled launch out;

first and second window comparators monitor an angular rate error, the first comparator detecting a start of a late phase in the zeroing of the rate error, the detection committing a final zeroing phase solely on a selected engaged gear pair, the second comparator detecting the angular rate error and zeros the angular rate error by commanding an engagement pressure to the selected gear pair.

\* \* \* \* \*